UNITED STATES PATENT OFFICE.

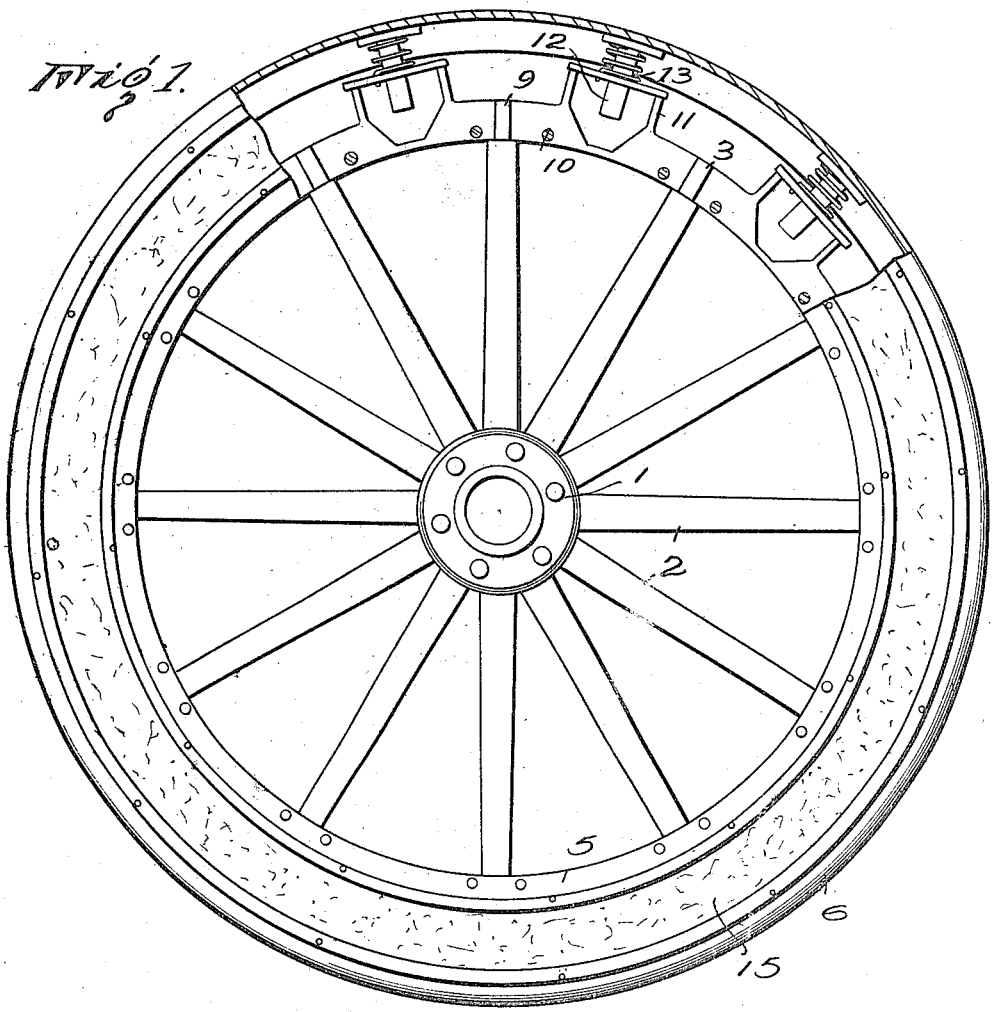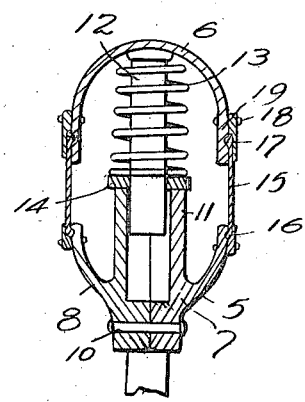

BENJAMIN W. BASS, OF MOORINGSPORT, LOUISIANA.

VEHICLE-WHEEL.

1,247,360.      Specification of Letters Patent.      Patented Nov. 20, 1917.

Application filed March 2, 1917. Serial No. 152,075.

*To all whom it may concern:*

Be it known that I, BENJAMIN W. BASS, a citizen of the United States, and resident of Mooringsport, in the parish of Caddo and State of Louisiana, have invented certain new and useful Improvements in Vehicle-Wheels, of which the following is a specification.

This invention relates to new and useful improvements in vehicle wheels, and the primary object of the invention is to provide a device of this character that includes a pair of concentrically mounted spaced rims that have interposed therebetween spring means, whereby the wheel is made resilient, without the necessity of employing a pneumatic tire.

Another object of the invention is to provide a vehicle wheel of this character which includes a rim attachment that is applicable to the conventional type of vehicle wheel, by the removal of the rim therefrom, and the application of my new and improved rim construction to the outer ends of the spokes.

Still another object of the invention is to provide a device of this character, which is easily and simply constructed, inexpensive to manufacture, and one which will be very efficient in operation.

With these and numerous other objects in view, my invention consists of the novel features of construction, combination and arrangement of parts which will be herein referred to and more particularly pointed out in the specification and claim.

In the accompanying drawing:

Figure 1 is a side elevation of a vehicle wheel, showing a portion of the rim thereof in section, and Fig. 2 is a transverse section through the rim portion of the wheel.

In describing my invention I shall refer to the drawing in which similar reference characters designate corresponding parts throughout the several views. The vehicle wheel is provided with the usual type of hub 1, that has a plurality of radially projecting spokes 2 carried thereby, that have their outer ends 3 reduced, as is used in the conventional type of vehicle wheel.

My new and improved spring means comprises a pair of concentrically mounted inner and outer rims 5 and 6, the said rims being curved transversely, and oppositely with respect to each other, so that their edges are disposed in spaced relation, but in comparatively close proximity.

The inner rim 5 is formed in two sections 7 and 8, which are provided with a plurality of coacting semicircular recesses 9, spaced thereon, and which are adapted to be secured together by bolts 10, whereupon the reduced ends 3 of the spokes 2 will be securely held within said recesses. This enables the inner rim 5 to be applied to the conventional type of vehicle wheel structure, without any material change to the same. The inner rim 5 is also provided with a plurality of socket members 11, preferably one socket member being positioned between each of the adjacent spokes.

The outer concentrically mounted rim 6 is provided with a plurality of coacting plungers 12, that project radially inwardly from the inner surface thereof, and which are adapted to be slidably mounted within the recess members 11 carried by the inner rim. Coil springs 13 are provided between said spaced rims, said coil springs having one of their ends positioned against the inner surface of the outer rim portion 6, while the opposite end thereof is secured to a washer plate 14, that is positioned on the top or upper edge of the socket members 11. These coil springs 13 furnish the spring means to hold the outer rim 6 in spaced relation from the inner rim, and also to take up all the shocks and jars incidental to the operation of the wheel.

It is obvious that when the inner and outer rim sections are in position, a space will be left between the adjacent edges thereof, and to prevent dust, dirt, etc., from entering in this space, I have provided a protecting cover 15, which is formed of some flexible material, preferably rubber, and which is adapted to stretch from adjacent one edge of the rims to the other. The flexible covers or protectors are formed of annular strips, and adjacent the peripheral and inner edges thereof are laterally projecting beads 16, that are adapted to fit into grooves 17 in the outer surfaces of the inner and outer rim sections adjacent the edges thereof. The flexible protector strips are held in position by fastening rings 18 that are secured to the outer sides of said rim sections by rivets 19, is clearly shown in Fig. 2 of the drawing.

When the various parts of this vehicle wheel are assembled, it is obvious that the coil springs, and the coacting of plungers and socket members will space the outer rim section from the inner rim section, and hence it is apparent that a certain amount of play is allowed between the two rim sections, to take up all the shocks and jars incidental to the operation of the wheel. As soon as any undue pressure is removed therefrom, the outer rim section will spring back to its original position, that is concentrically mounted with respect to the inner rim section thereby. The socket members are larger than the plungers that are positioned therein, so as to allow sufficient movement therebetween. The said members however are only sufficiently wide to allow the plungers to slide freely therein, so as to prevent any lateral movement of the outer rim with respect to the body portion of the wheel. The protective covering strips between the rim sections prevent dust, dirt, and the like from entering the same, and clogging the spring means.

From the foregoing description of the construction and operation of my new and improved vehicle wheel, the manner of applying the same to use and the operation thereof will be readily understood, and it will be seen that I have provided a simple and efficient means for carrying out the objects of this invention.

Having thus fully described my invention, what I claim as new and desire to secure by Letters Patent, is:

In a resilient wheel, an inner rim formed of a plurality of circular sections adapted to be fitted together, said sections having complementally spaced and arranged recesses formed therein to form a plurality of sockets, a concentrically mounted outer rim, plungers carried on the outer rim coöperating with said sockets, and cushioning means surrounding portions of the plungers.

In testimony whereof, I affix my signature hereto.

BENJAMIN W. BASS.